Jan. 15, 1952
A. GOURGUES
2,582,865
HEATING CONTAINER FOR RAPID PREPARATION OF HOT DRINKS
Filed Nov. 26. 1946
6 Sheets-Sheet 1
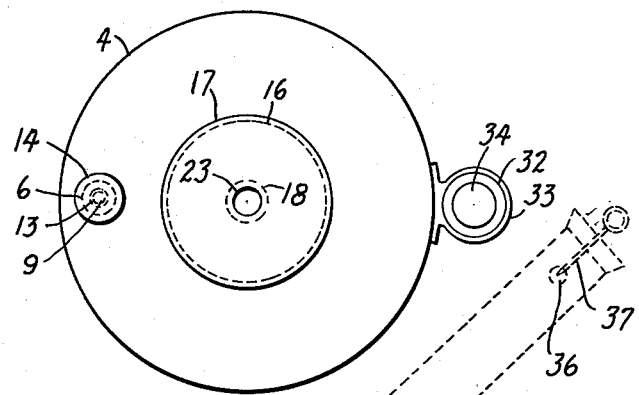
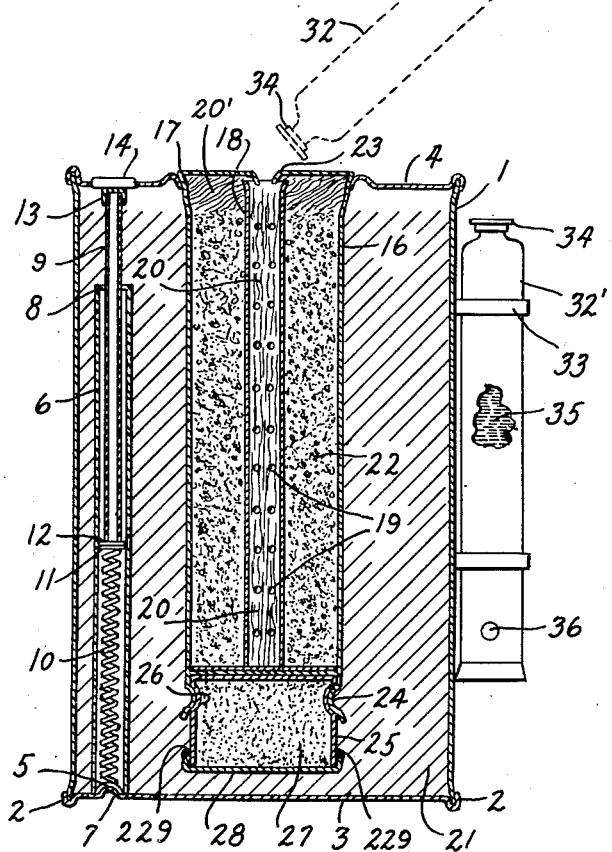
INVENTOR:
ALBERT GOURGUES
BY
Richardson, David and Nerdon
ATTORNEYS Jan. 15, 1952 A. GOURGUES 2,582,865
HEATING CONTAINER FOR RAPID PREPARATION OF HOT DRINKS
Filed Nov. 26, 1946 6 Sheets-Sheet 2
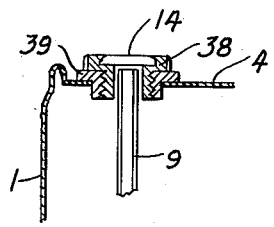
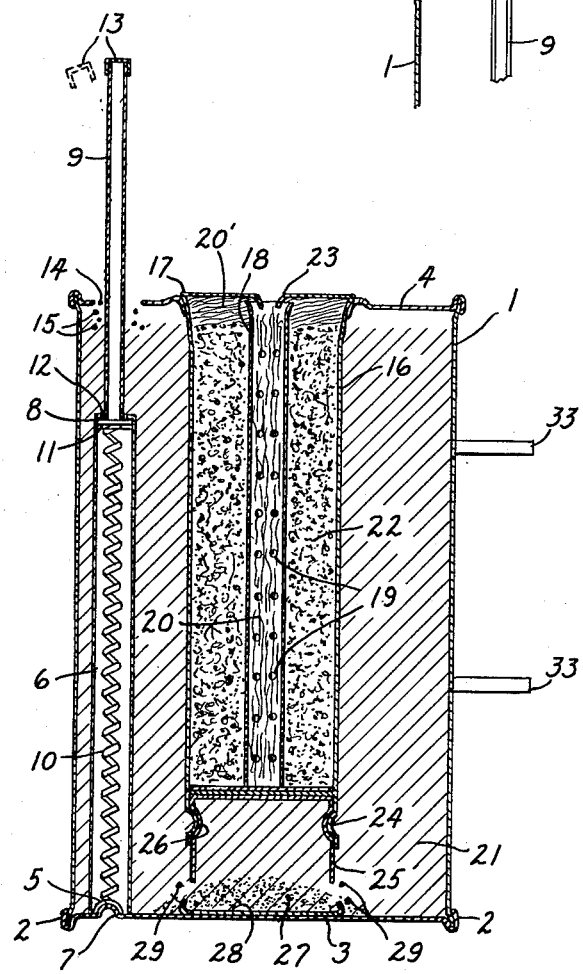
INVENTOR:
ALBERT GOURGUES
BY
Richardson, David and Nordon
ATTORNEYS Jan. 15, 1952        A. GOURGUES        2,582,865
HEATING CONTAINER FOR RAPID PREPARATION OF HOT DRINKS
Filed Nov. 26, 1946        6 Sheets-Sheet 3
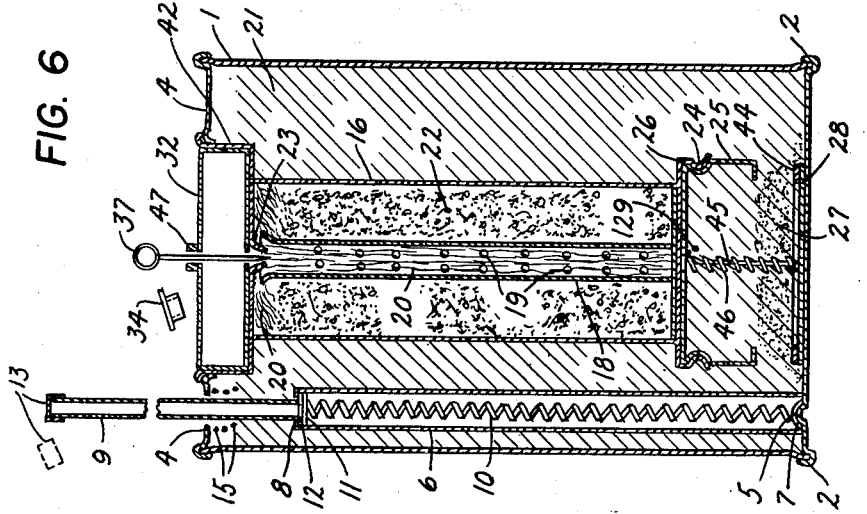
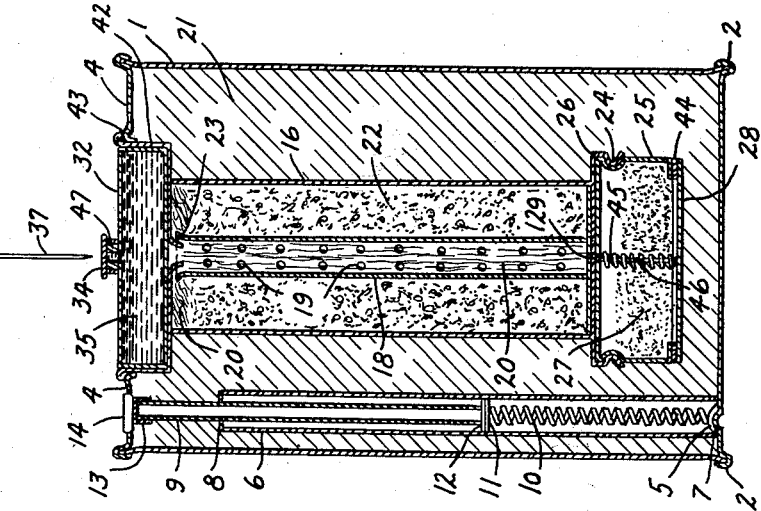
INVENTOR:
ALBERT GOURGUES
BY
Richardson, David and Norton
ATTORNEYS

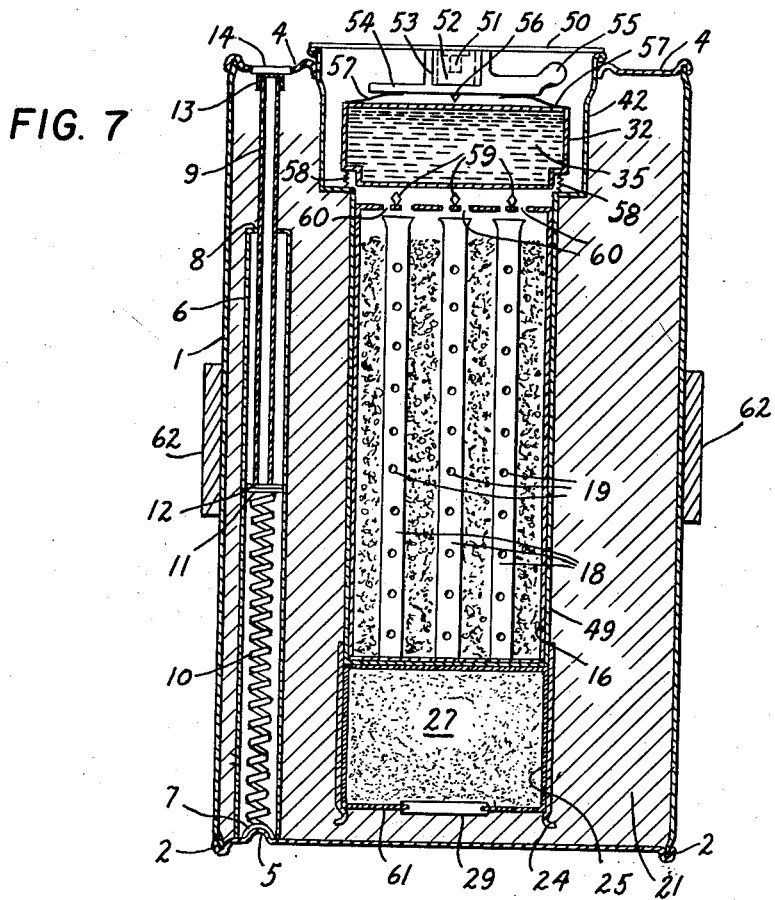
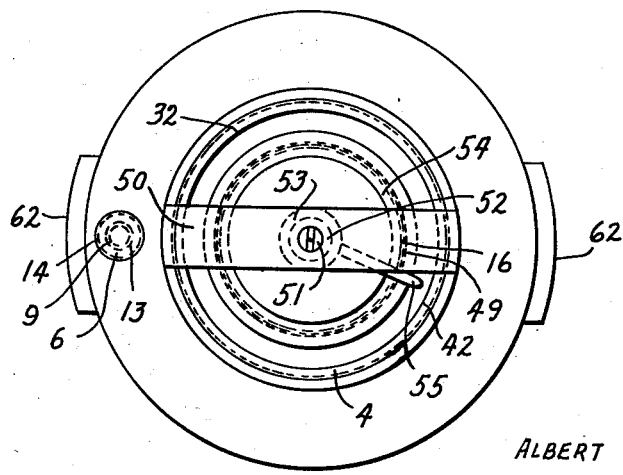

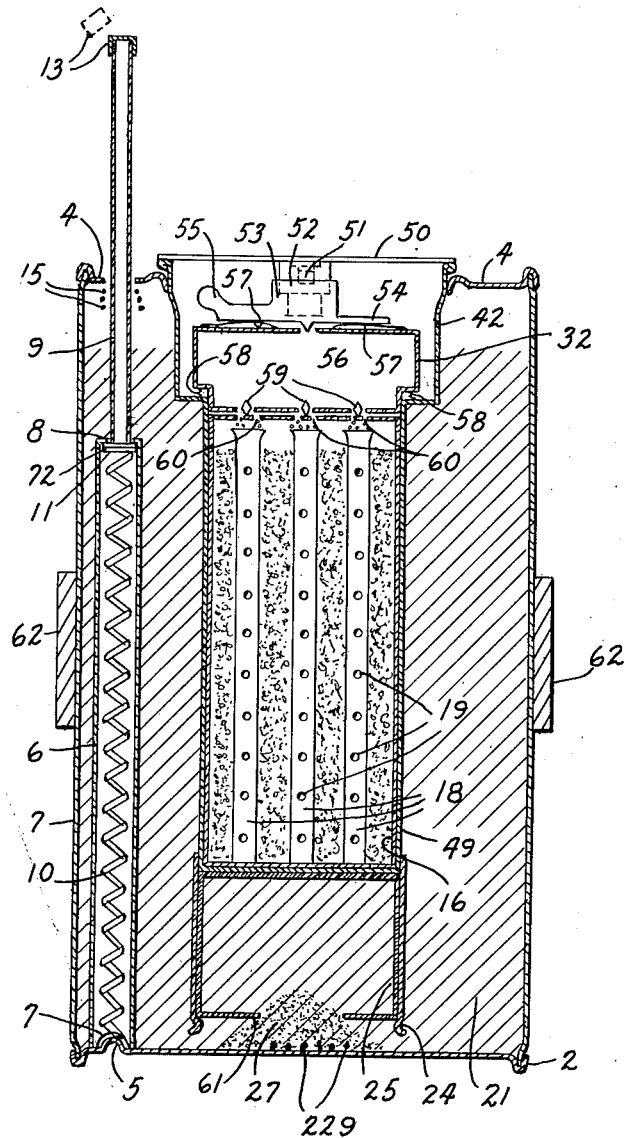

Patented Jan. 15, 1952

2,582,865

UNITED STATES PATENT OFFICE 2,582,865

HEATING CONTAINER FOR RAPID PREPARATION OF HOT DRINKS

Albert Gourgues, Lyon, France

Application November 26, 1946, Serial No. 712,390
In France September 14, 1946

7 Claims. (Cl. 126—262)

My invention has for its object a heating container or the like apparatus adapted to produce hot drinks.

It has for its chief object to allow such apparatuses to be used in a more practical manner and chiefly to allow easier drinking at any place and under any circumstances of the hot beverage so prepared.

It consists chiefly for this purpose in providing the heating container whatever may be the manner of heating the same, with a telescopic tube which in its inoperative position is held enclosed inside the container and which, when the heating is performed and has brought the prepared liquid drink to a suitable temperature, emerges through the cover of said receiver and projects thus to the outside thereof after the manner of a straw or suction tube, while bursting under the action of a thrust spring, through a fusible part made of a low temperature melting alloy holding it in place up to said moment.

As disclosed hereinabove, this arrangement of an automatically rising tube allows drinking the prepared beverage by sucking it in the same manner as with a straw without requiring a cup or the like container and it is applicable to any heating container. But it seems to be of particular interest in its application to containers heated through an exothermic reaction because it complements them advantageously to this end.

My invention covers also in association with said system a novel design of this kind of receivers according to which the substances producing the exothermic reaction are located at the center of said receiver in a fluidtight casing constituted by a cylindrical cartridge radiating heat in all directions into the liquid mass surrounding it; said casing may be advantageously a removable one so as to allow after utilisation and through a very simple handling the reloading of the container for the subsequent preparation, immediately or otherwise, of another hot drink. In this case, the fusible part retaining in place the tube and which has melted is also designed in a manner such that it may easily be replaced by a new fusible part.

This type of apparatus is on the other hand of considerable interest for the use of the special bags opening automatically also through the agency of a low melting alloy which forms the object of my copending U. S. application Ser. No. 712,389 filed on November 26, 1946, and entitled: "Bag or Case for Food Products"; however the composition of the fusible element should be selected in this case in a manner such that the fusible forming part of the bag may melt at a lower temperature than that holding the tube.

A heating receiver provided with such improvements allows thus the preparation in a few minutes when travelling or on an excursion, in other words at any place and under any circumstances of a hot drink which may then be drunk without resorting to any external means and which according to the nature of the product contained in the bag introduced in the apparatus may be, for instance, without this enumeration being of course limitative, coffee, tea, milk, chocolate, sugared and spiced or not, a punch, a suitable infusion of lime, mint, camomile, vervaine etc. . . . consommé, meat extract and the like.

My invention will be better understood by referring to the accompanying drawings showing by way of example a certain number of forms of construction of heating containers of various designs embodying an unique basic concept. In said drawings Fig. 1 is an elevational cross sectional view through the axis thereof of the simplest form of construction of a container adapted to be heated through a chemical reaction and provided with its suction tube, said container being designed as a non refillable container, which should be thrown away after the preparation and drinking of the infusion or solution of the product which has been introduced inside it at the moment of its preparation.

Fig. 2 is a corresponding plan view.

Fig. 3 is a view similar to Fig. 1 corresponding to the moment after reaction and release of the drinking tube.

Fig. 4 shows the manner of replacing the fusible element of the drinking tube.

Figs. 5 and 6 show in the same two abovementioned positions one form of a refillable container.

Figs. 7 and 8 are corresponding views in the same two positions of another form of construction of the container.

Fig. 9 is a plan view thereof.

Figure 10:
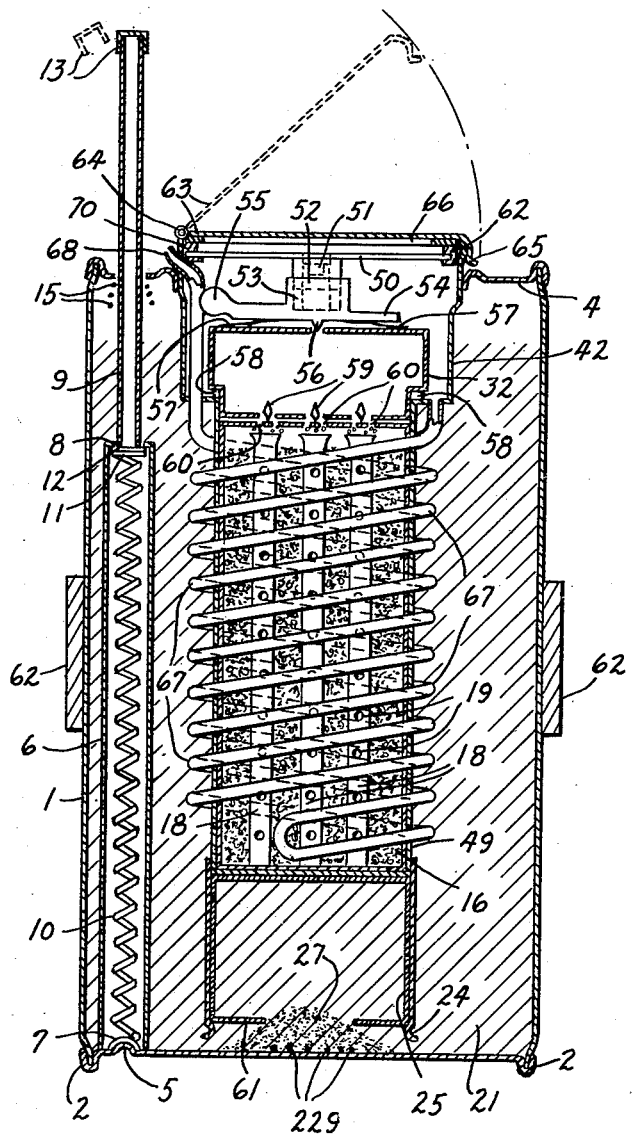
Fig. 10 is a view similar to Fig. 7 showing a container provided with a steam recovering system.

As shown in the different figures, the apparatus comprises a fluidtight container over the body 1 of which are fitted for instance at 2 a bottom 3 and a cover 4. Said apparatus is designed as follows:

On the bottom of the container is provided, on the inside thereof and on the left-hand-side of the figures of the accompanying drawings a boss or swelling 5 serving as a bearing and retaining means for a tube 6 notched at its base at 7 and carrying at its upper end a collar 8 serving as a guiding and stopping abutment for a still further tube 9 of smaller diameter which when located inside the preceding tube 6 is submitted to the action of a thrust spring 10 and includes at its lower end a circular shoulder 11 with a joint 12.

The upper part of this tube 9 is capped by a removable hood 13 and it is held in position inside the container by reason of its bearing under the action of the thrust spring 10 against a fusible element 14 of an alloy melting at low temperature such for instance as the Wood or Darcet type of alloy, carried by the cover 4.

Whatever may be the manner of heating the container, and whether its design is that of any of the accompanying figures, the operation of this system of telescopic tubes 6 and 9 is as follows:

When the drink is prepared and it has reached a suitable temperature of the magnitude of 90 to 95° C., the fusible part 14 melts and releases thus the tube 9. The latter is urged by the spring 10 through the cover and moves outwardly (Figs. 3, 6, 8 and 10) and projects beyond the casing until the collar 11 with the joint 12 abuts against the restricted portion or collar 8 forming an abutment at the end of the stationary tube 6.

In said Figures 3, 6, 8 and 10, the reference number 15 denotes the drops of molten fusible material.

For drinking, it is then sufficient to remove the hood 13 the object of which is to prevent the molten fusible part 14 from entering the tube 9 and choking same. The tube should then be brought to the mouth for drinking through suction in the same manner as with a straw, which is much more practical than to have to pour the contents of the receiver into a glass or a cup, as said heating container system is chiefly intended for use when travelling by automobile, railroad, airplane or ship or in any particular circumstances liable to produce violent shocks, in which case it is difficult to pour the liquid into a glass or cup and to drink it without spilling some of it.

The different figures of the drawings show different manners of executing such a heating container.

In the form of Figs. 1 and 2, designed for throwing away after use, the cover 4 of the receiver includes at its center a port inside which is fitted a tube 16 closed at both ends and the upper end 17 of which is slightly flaring so that its frictional fitting inside the opening in the cover 4 may ensure the final watertightness of the container and prevent the liquid 21 contained therein from being spilled outside the container.

Inside said tube 16 and in its center, is located another tube 18 of smaller diameter which is provided with a number of small openings 19 and is filled with glass threads 20.

The tube 16 is filled with a mixture of solid substances 22 adapted to produce an exothermic reaction in the presence of an oxidising liquid. Said mixture of substances is also capped by a layer of glass threads 20.

The upper cover of the tube 16 is provided at its center with a port 23, acting as a funnel above the central tube 18.

Moreover, the tube 16 includes at its lower part a plurality of spring blades 24 forming claws for holding between them a receiver 25 provided for this purpose with an annular groove 26 allowing its easy introduction and removal.

This receiver 25 contains the foodstuff 27 of which it is desired to obtain a decoction or solution and it is closed at its lower end in a fluid-tight manner by a cover 28 welded thereto by means of a fusible part 229 melting at a temperature of the magnitude of 60 to 65° C.

Lastly, on the outer wall of the body 1 of the container is located a removable reservoir 32 held fast by one or more collars 33 and which is closed by a screw plug 34 and contains the oxidising liquid product 35. Near its bottom, said reservoir 32 is provided with a surface element 36 which may be easily perforated by means of a needle.

For the preparation of a hot decoction or solution of the product 27, it is sufficient after separating the reservoir 32 from the container 1 to unscrew the plug 34 and to empty the contents of the reservoir as shown in dotted lines in Fig. 1 into the port 23. In order to allow the liquid to flow out freely, it is sufficient to perforate the receiver at 36 by means of any needle such as that shown at 37. The oxidizing liquid enters the central tube 18 and through the openings 19 of said tube it comes into contact with and impregnates the mass 22 of the solid mixture to be oxidised. The exothermic reaction is then immediately initiated and the mass reaches rapidly a high temperature of the magnitude of 130 to 140° C. which leads to a rapid heating of the water 21 inside which said mixture is placed.

When the water 21 has reached a temperature of the magnitude of 65 to 75° C. the fusible part 29 melts and releases the cover 28 (Fig. 3). The product contained inside the receiver 25 comes then into contact with the hot water and dissolves therein or is admixed with said hot water for producing the desired hot drink.

The above described apparatus is more particularly designed for use as a device adapted to be utilized but in a single instance, i. e., it should be thrown away after use.

It may also be advantageously designed under a form adapted to be reused after refilling; this is the case for instance when it is designed under either form of construction illustrated in Figs. 5, 7 and 10 and also in Fig. 4, as concerns the fusible part 14 of the drinking tube.

As a matter of fact it is necessary in this case not only to provide for the possible reloading of the container with water and the replacement of the cartridge formed by the tube 16 and also of the bag or container 25, but also for the replacement of the fusible part 14. For this purpose (Fig. 4) said fusible part may be advantageously fitted inside the central opening of a small plug 38 adapted to be screwed on the mouthpiece 39 secured to the stationary cover 4 of the apparatus.

It is thus sufficient after said fusible part has melted to unscrew the plug 38 and to replace it, after having forced the drinking tube 9 to recede inside the apparatus, by a spare plug provided with a new fusible part.

This system including a removable fusible part has been shown separate in Fig. 4, but obviously it may replace the fusible part 14 illustrated diagramamtically in Figs. 5 to 10, the manner of showing the fusible part being resorted to only for the sake of making the reading of the drawing simpler.

Reverting to Fig. 5, the form of construction depicted therein shows a container adapted to be refilled while the reservoir 32 containing the oxidizing liquid 35 caps directly the tubular cartridge 16 containing the material to be oxidised.

This tubular cartridge 16 is rigid with a cup 42 capping it and which serves as a housing for the abovementioned reservoir 32 carrying a central closing plug 34. The bottom of this cap is provided with a central opening 23 forming a funnel and capping the inner tube 18 of the cartridge 16, while the circular edge of cup 42 is slightly flared for fitting frictionally inside the opening 43 provided therefor in the cover 4, said fitting of the cup 42 being similar to that generally used for closing the so-called coin operated containers.

As to the bag or case 25, filled with the product 27, it is held as in the preceding embodiment by claws 24 arranged underneath the tubular cartridge 16. The closing means incorporated therewith may be similar to that of the embodiment of Fig. 1, but it may also be constructed by holding its cover 28 fast against a joint 44 under the action of a rod 45 secured to the opposite side of the bag or case considered; said rod 45 is secured to the opposite side of the bag or case which is in direct contact with the bottom of the tubular cartridge through a small welding piece 129 of an alloy melting at low temperature, with the insertion inside the case of a compressed spring 46 the ends of which are secured to the corresponding flat sides of the bag or case.

The operation will be readily understood and the manner of using the heating container is as follows:

When loaded, it is sufficient for making the apparatus begin reacting i. e. for starting the heating, to unscrew the plug 34 and to introduce a needle 37 through the corresponding opening 47, for perforating the bottom of the reservoir 32 which allows flow of the oxidising liquid 35 into the tube 18. The operation is from this moment onwards identical with that of the apparatus illustrated in Fig. 1 except for the fact that the opening of the bag or container, hereinafter referred to as a case 25 is obtained through the forced outward projection of the cover 28 under the action of the expansion of the spring 46 when the fusible element 129 has melted (see Fig. 6).

Once the drink has been consumed, it is sufficient for refilling the container and allowing a subsequent use thereof, to introduce any suitable device such as a coin between the edge of the cover 4 and the edge of the cup 42 for releasing the latter and allowing it to be removed from the apparatus, together with the reservoir 32, the tubular cartridge 16 and the bag or container 25 with its cover 28 hanging to the spring 46, all said members being connected together.

It is then possible to again fill with water the receiver through the opening 43 of its cover and to reinsert a new cartridge 16 with its reservoir 32 after engagement inside the claws 24 of a bag or a case 25 enclosing the substances of which it is desired to obtain a decoction or solution.

After replacing the fusible part 14 of the suction pipe, the apparatus is thus ready for further operation, which further operation may, as a matter of fact, be required only a very long time later.

Figs. 7 to 9 show another form of construction which differs from that of Figs. 5 and 6 only in the manner of perforating the reservoir 32, which requires a still simpler operation and may be performed very easily by the driver of an automobile, a bicycle runner for instance or the like without losing control of his wheel or handle bar, merely by means of a partial rotation imparted to a handle, requiring only one hand for operation.

To this end, the cup 42 inside which is located the reservoir 32 is capped by a transverse bar 50 on the underside of which is secured through a screw 51 a tapped nut 52 having a high pitch and threaded in its turn inside a tapped member 53 rigid with the plate 54 carrying the handle 55.

The lower surface of said plate 54 carries a keen spike 56 and between said plate and the upper surface of the reservoir 32 is inserted a spring 57. On its opposite side, said reservoir is held raised by springs 58 bearing against a ledge provided on the cup 42.

Lastly, between the lower surface of this reservoir 32 and the upper part of the cartridge housed inside a cylindrical extension 49 of the cup 42, may be inserted one or more spikes 59 arranged above the tube or tubes 18 of the cartridge, of which three are shown in the example considered.

The springs 57 and 58 hold the reservoir 32 floating at equal distances between the spikes 56 and 59.

To produce the flow of oxidising liquid 35 out of the reservoir, it is then sufficient to make the handle 55 execute about one half revolution (Fig. 8) which produces through the agency of the coarse pitch screws 52, 53, a sinking movement of the plate 54, which compresses the springs 57 and 58 and produces first the perforation of the upper wall of the reservoir 32 through the spike 56 and then that of its lower wall through the spikes 59. The oxidising liquid 35 flows then into the tubes 18 of the heating cartridge through the ports 60 provided in the wall forming a permanent bearing for the spikes 59. The case is the same for the spike 56.

It should be noticed that these spikes 59 have a lanceolated outline so that after they have perforated the bottom of the reservoir 32 they can no longer choke the perforations thus made.

In these Figures 7 and 8 is also illustrated another form of construction of the means of opening the bag or case by closing its bottom with a fusible element 229, the melting of which allows, as shown in Fig. 8, the passage of hot water 21 on to the substances 27 in the bag.

In Figs. 7 to 9, insulated rings 62 are fitted on the body 1 of the containers for allowing them to be carried without burning the user's hand during operation.

The reloading of the apparatus after use is performed substantially as in the case of the preceding Figs. 5 and 6. It is sufficient to this end to raise the removable bar 50, to remove the reservoir 32 and the heating cartridge 16 and to replace same by a new reservoir and a new cartridge, after which the bar 50 is reinserted. The bag 25 is also removed and replaced by another suitably chosen bag. The container is filled with water and the fusible member 14 is also changed.

The apparatus illustrated in Fig. 10 is of a similar design and differs only in the following points. When for instance the apparatus is to be used on an excursion in high mountains or in very cold countries, it may be of advantage to load the apparatus with water or snow only at the moment of using it, by reason of the useless dead weight formed by such water and of the risk of freezing.

In this case, by reason of the very cold atmospheric circumstances, it is necessary to provide many more heat units without increasing for this reason either the weight or size of the heating elements.

This result may be obtained by recovering the steam escaping normally from the heating cartridge and in constraining the same to pass through the mass of water to be heated while maintaining a certain pressure on the same. In the form of construction of Fig. 10, the removable bar 50 is secured inside suitably grooved members 62 carrying the starting arrangement which has just been described. The cup 42 is then closed by a cover 63 with a hinge 64 and a closing hook 65. A joint 66 allows, when the cover is closed, perfect hermetic seal to be obtained for said cup whereby the steam evolved during reaction by the cartridge can no longer diffuse into the atmosphere. It is on the contrary constrained to enter a worm 67 surrounding said cartridge and to flow throughout the same before finally escaping through the small diameter opening 68 at the upper end of the return branch of the worm.

A similar arrangement for recovering steam may obviously be provided in association with any of the forms of construction of Figs. 1 to 9.

Similarly the system for opening the bag or case containing the substances 27 may be of any of the types disclosed whatever may be the form of construction selected for the container. It may also be designed in a different manner, for instance under the form of an actual bag formed of two sheets of a thin yielding material wound round the heating cartridge, provided a fusible element is always resorted to for producing its automatic opening when the water inside which it is immersed has reached a sufficient temperature.

The reservoir 32 may also be designed in a manner such that its perforation does not lead to its being immediately cast off, by providing for said perforations to be formed in elements adapted to be reloaded or changed.

As to the number of inner tubes 18 provided in the heating cartridges it may indifferently, as in the case of Figs. 1 to 6, be reduced to a single tube arranged axially or else be increased so that the tubes may be uniformly distributed throughout the mass to be oxidised as illustrated in Figs. 7 to 10.

Lastly, as obvious and as apparent from the preceding disclosure, my invention is by no means limited to the single forms of construction described hereinabove by way of examples and it covers on the contrary all modifications thereof falling within the scope of the accompanying claims.

What I claim is:

1. In a beverage container of the type adapted to be subjected to a rise of temperature just prior to consumption of said beverage, a device for permitting the beverage to be raised above the level thereof present within said container, by atmospheric pressure upon the body of liquid therewithin, including a relatively elongated tube, spring means for raising the major portion of said tube above said container, restraining means normally holding said tube within said container, said restraining means being rendered ineffective only when heated to a predetermined temperature inferior to the temperature attained by said beverage just prior to the consumption thereof, but superior to normal circumambient atmospheric temperature, whereby heating of said beverage releases said tube, and said spring means raises the tube until the upper end thereof is accessible, so that atmospheric pressure upon the liquid surface therewithin may be reduced by pulmonary means, thereby causing upward liquid flow through said tube.

2. A beverage raising device as defined in claim 1, wherein said restraining means comprises a material fusing within the temperature range defined in claim 1.

3. A beverage raising device as defined in claim 2, wherein said fusing material comprises a metallic alloy.

4. A beverage raising device as defined in claim 1, wherein said tube is provided with a closure element upon the upper end thereof, removable only after said tube has been raised.

5. A beverage raising device as defined in claim 1, wherein said restraining means comprises a fusible element overlying the upper end of said tube, while the tube is in the depressed position thereof.

6. A beverage raising device as defined in claim 1, wherein said container is provided with a vertically extending cylindrical chamber of greater length than said tube and of a diameter at the upper end reduced to a size permitting said tube to move upwardly therein, said restraining means closes the upper end of said chamber, and said spring means comprises a coiled spring, normally compressed between the lower end of said tube and the bottom of said chamber.

7. A beverage raising device as defined in claim 1, wherein said beverage is in close thermal association with said restraining means.

ALBERT GOURGUES.

REFERENCES CITED

The following references are of record in the file of this patent:

UNITED STATES PATENTS

| Number | Name | Date |
|---|---|---|
| 654,174 | Murmann et al. | July 24, 1900 |
| 720,435 | Jewett | Feb. 10, 1903 |
| 972,304 | White | Oct. 11, 1910 |
| 1,203,217 | MacGregor | Oct. 31, 1916 |
| 1,751,387 | Bielek | Mar. 18, 1930 |
| 1,997,914 | Pollard | Apr. 16, 1935 |
| 2,020,292 | Eggert et al. | Nov. 12, 1935 |
| 2,052,307 | Kennedy | Aug. 25, 1936 |
| 2,288,895 | Fink | July 7, 1942 |
| 2,294,224 | Daly | Aug. 25, 1942 |
| 2,392,479 | Humbert | Jan. 8, 1946 |

FOREIGN PATENTS

| Number | Country | Date |
|---|---|---|
| 161,501 | Germany | 1905 |